June 19, 1962   F. G. REUTER   3,039,795
FLEXIBLE EXPANSION PIPE JOINT HAVING RADIAL LIMITING MEANS
Filed Nov. 25, 1957

INVENTOR:
FRANZ GOTTFRIED REUTER
BY Clelle W. Upchurch
ATTORNEY

United States Patent Office 3,039,795
Patented June 19, 1962

---

3,039,795
FLEXIBLE EXPANSION PIPE JOINT HAVING RADIAL LIMITING MEANS
Franz Gottfried Reuter, Lemforde, Hannover, Germany, assignor, by mesne assignments, to Mobay Chemical Company, Pittsburgh, Pa., a corporation of Delaware
Filed Nov. 25, 1957, Ser. No. 698,698
Claims priority, application Germany Nov. 27, 1956
3 Claims. (Cl. 285—235)

This invention relates generally to expansion joints for pipe lines and, more particularly, to a novel rubber-like expansion joint or flexible joint for pipe lines and a pipe line assembly.

It has been proposed heretofore to provide pipe lines with an expansion joint to compensate for changes in the length of the pipe line with changes in the temperature. Usually in practice a pipe line is provided with a loop or a piece of flexible corrugated pipe or bellows at predetermined intervals to permit expansion and contraction of the pipe line without breaking the joint between pipe sections. It has also been proposed to insert rings of natural or synthetic rubber containing metal reinforcing rings at intervals between lengths of pipe in the pipe line to compensate for length changes due to temperature changes. Such inserts have not proved entirely satisfactory because rubber is often affected adversely by the liquid passing through the pipe line and deteriorates with age when exposed to changing weather conditions. Furthermore, the heretofore available rubber joints have contained several independent rings of one revolution each spaced along the length of the insert. Such joints are not capable of withstanding very high pressures in the pipe line and the rubber stretches between the ring inserts and is pushed outwardly between the rings by the internal pressure.

It is therefore an object of this invention to provide a novel and improved rubber-like expansion joint for pipe lines. Another object of the invention is to provide a method for adapting pipe lines to changes in temperature without breaking the connection between pipe lengths or otherwise causing rupture of the pipe line. A more specific object of the invention is to provide an expansion joint for pipe lines which is adapted to withstand the attack of corrosive liquids or slurries and to withstand high internal pressures without rupturing.

Figure 1:
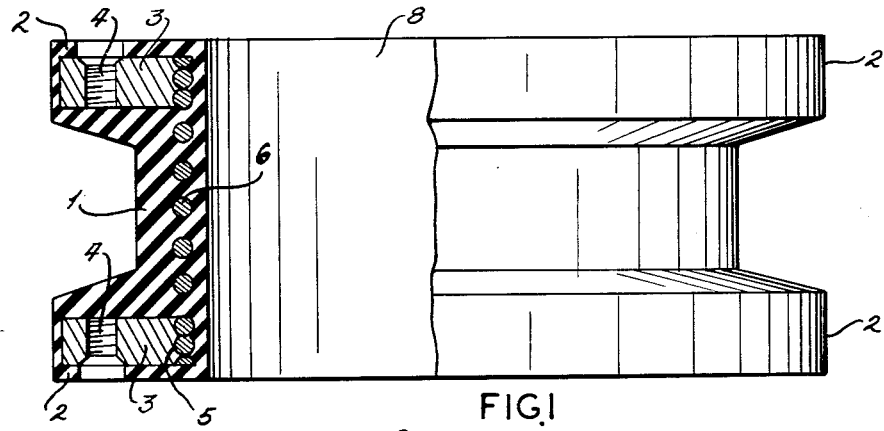
Figure 2:
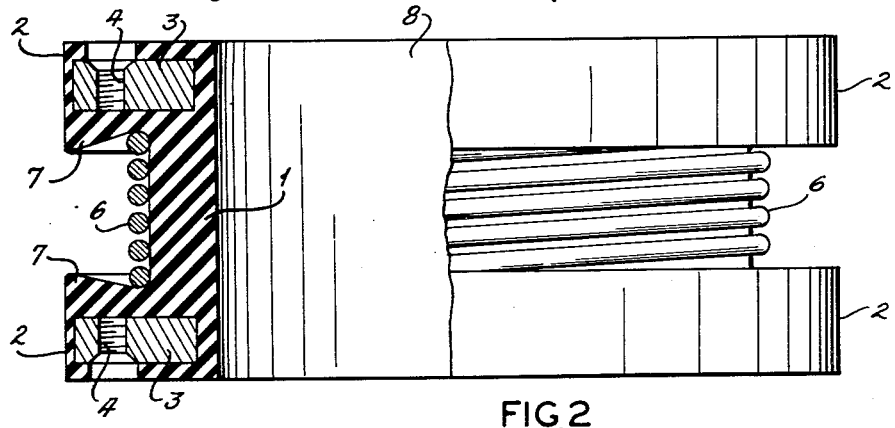
Figure 3:
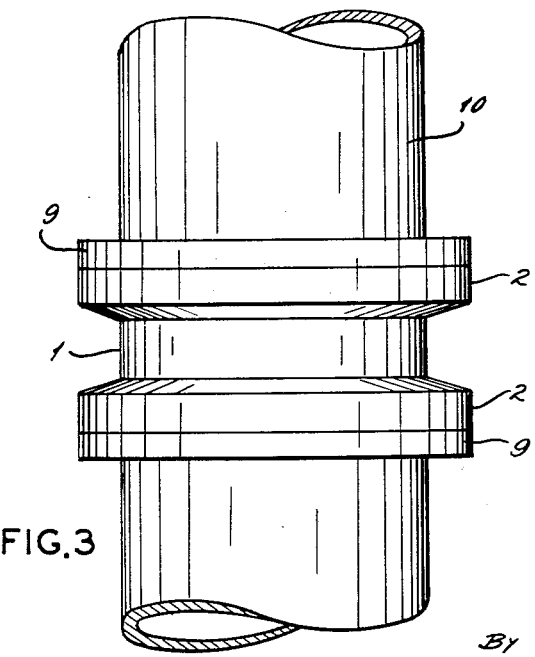

Other objects will become apparent from the following description of the invention with reference to the accompanying drawing in which
FIGURE 1 is an elevation partially in section of one embodiment of the invention;
FIGURE 2 is an elevation partially in section of another embodiment of the invention; and
FIGURE 3 illustrates an embodiment of the invention positioned between two flanged pipes.

Generally speaking, the foregoing objects and others are accomplished in accordance with this invention by providing a shaped substantially non-porous or homogeneous rubber-like polyurethane member adapted to fit between the ends of lengths of pipe making up a pipe line and adapted to compensate for expansion and contraction of the pipe line with changes in temperature. The novel expansion joint provided by this invention is cast or otherwise shaped from a homogeneous rubber-like polyurethane composition and has a metal reinforcing ring in each end thereof. The joint has an internal bore extending longitudinally therethrough and external flanges at each end thereof. The metal reinforcing ring extends into these flanges and provides for securely attaching the flanges of the joint to corresponding flanges of a length of pipe. The bore of the joint may have a diameter substantially equal to the diameter of the pipe to which the joint is to be attached and the external diameter of the joint at the flanged ends is substantially equal to the diameter of the flanged end of the pipe. The metal reinforcing rings and overlying polyurethane are provided with longitudinally extending bores adapted to receive bolts or other means for fastening the flanges of a joint to the flanges of a pipe. The wall of the joint is reinforced by means of a spirally-wound metal strip which may be a spirally-wound band or a spirally-wound wire, such as, for example, a coil spring, or the like.

In one of the preferred embodiments of the invention, each end of the metal reinforcing strip is attached to one of the metal ring inserts and twists spirally about the wall of the bore between the two rings. In this embodiment, the spirally-wound strip is imbedded throughout its length in the polyurethane.

In another preferred embodiment of the invention, the external flanges of the joint are provided with inwardly tapered facing surfaces. In other words, the surface of each flange opposite that surface which will be against the flange of the pipe is a tapered surface with the maximum thickness of the flange being spaced from the external cylindrical wall between the flanges and about the bore. In this embodiment, a spirally-wound strip extends about the external cylindrical wall between the two flanges and is secured in place by the tapered surfaces of the flange. Preferably, the spirally-wound strip of this embodiment is of somewhat lesser diameter than the external diameter of the joints between the flanged portions and thus fits tightly about the joint.

The rubber-like portion of the joint provided by this invention may be formed from any suitable substantially non-porous or homogeneous rubber-like polyurethane. However, in order to give best results, the polyurethane should have a Shore A hardness of from about 50° to about 80° and an elasticity of from about 35% to about 60%. The polyurethane may be prepared by reacting any suitable organic polyisocyanate with any suitable organic compound having reactive hydrogens and capable of reacting with the polyisocyanate to form a polyurethane. For example, 1,5-naphthylene diisocyanate, p-phenylene diisocyanate or 4,4'-diphenyl dimethylmethane diisocyanate may be reacted with a polyester, polyalkylene ether glycol, a polythioether glycol or the like having terminal groups which are predominately hydroxyl groups and a molecular weight of at least 750 and the resulting product may be cross-linked with an organic chain extender or cross-linker. Suitable cross-linking agents include ethylene glycol, diethylene glycol, butanediol, diprimary aliphatic and aromatic diamines, such as toluylene diamine, or the like. Indeed, any organic compound having reactive hydrogen atoms, organic polyisocyanate and cross-linker disclosed in U.S. Patents 2,729,618; 2,621,166; and 2,620,516 may be used in forming the polyurethanes and any of the processes disclosed in these patents may be followed in making a polyurethane suitable for shaping the joint of this invention. Usually the joint will be formed by pouring a molten polyurethane in a suitable mold and about the metal parts to be imbedded therein, and the contents of the mold will then be heated until cross-linking and curing has been obtained with solidification of the polyurethane into a hard rubber-like substantially non-porous product having the shape of the mold.

The metal ring insert may be bronze, brass, iron, copper, or the like, but in most instances it is preferred to use a mild steel insert. The spirally-wound metal reinforcing member or strip may be either a band of metal or a wire and may be formed from any suitable metal, such as copper, iron, or the like, but it is preferred to use an iron or steel wire for most purposes. In the embodiment wherein the strip is exposed to the weather, it may be desirable to protect the steel or iron from the weather by providing it with a suitable coating, such as by galvanizing, electroplating with copper, zinc, or the like.

It has been found that the expansion joint provided by this invention can withstand internal pressures and that it is not adversely affected by most chemicals which may be pumped through a pipe line. Moreover, the inner surface of the joint does not become worn from abrasion by suspended particles in slurries pumped through the pipe line. Furthermore, the joint will expand or contract uniformly with change in temperature without rupture of the pipe line.

It is preferred to completely imbed the metal ring inserts at each end of the flexible joint in order to insure proper joining of the polyurethane body and a unitary product. Moreover, the polyurethane protects the inserts from the weather. These rings in the flanges are particularly advantageous because they distribute the load from the flange bolts over the surrounding areas of the polyurethane body. These inserts are complete rings which extend entirely around the pipe joint forming a core within the flange.

One of the advantages of securing the ends of the spirally-wound metal reinforcing member to the metal ring inserts at each end of the joint is that the ring-like inserts hold the coil spring or other spirally-wound strip in its proper place in the mold while the homogeneous polyurethane is cast thereabout. The ring inserts also help hold the spirally-wound members in their proper place within the joint after the joint is in place in the pipe line.

Referring now to the drawing for a more detailed description of embodiments of the invention, the embodiment of FIGURE 1 is shown partially in section to illustrate the position of spirally-wound reinforcing member 6 and ring 3 in the polyurethane body 1. This embodiment is provided with external flanges 2 at each end thereof, and spirally-wound strip 6 is secured at each end to the metal ring 3. Metal ring 3 is provided with a longitudinally extending bore 4 adapted to receive a bolt or other fastening means used to secure the joint to the flange of a pipe. Metal insert 3 is a complete ring extending completely around the circumference of the joint. Metal member 6 may be advantageously a coil spring of steel. This coil spring protects the polyurethane body 1 against bulging when exposed to high internal pressures. It does not prevent longitudinal expansion or contraction of the joint to compensate for longitudinal expansion or contraction of the pipe line with temperature change. It is to be noted that the external wall of the joint between the two flanges is substantially cylindrical in this embodiment and that the internal wall about bore 8 is also substantially cylindrical. The embodiment illustrated in FIGURE 1 is provided with a polyurethane body 1 having an elasticity of about 50%, a Shore A hardness of about 60° and an elongation of about 600%. The embodiment of FIGURE 2 has two inserts 3 imbedded in body 1 which reinforce external flanges 2 at each end of the joint. Insert 3 is provided with a longitudinally extending bore 4 adapted to receive a bolt which fastens the flange of a pipe thereto. These bores 4 are spaced at intervals around the circumference of the joint in a number equal to the number of holes in the flange of the pipe. As is apparent from the drawing of this embodiment, the thickness of the flange at the maximum diameter of the joint is greater than the thickness adjacent the external cylindrical wall extending between the two flanges. Flanges 2 thus have tapered surfaces facing each other and projecting edge 7. Spirally-wound metal member 6 extends around the cylindrical external wall of the joint and is held in place by the tapered surfaces of the two flanges 2. Projecting edge 7 secures the spirally-wound member in place. Bore 8 of this embodiment is surrounded by a substantially cylindrical inner wall. The physical characteristics of the polyurethane are essentially the same as those of the polyurethane of FIGURE 1.

FIGURE 3 is an illustration of joint 1 secured to the ends of two pipes 10 having flanges 9 showing the joint in its position when assembled in a pipe line.

The following example illustrates the preparation of one polyurethane suitable for forming the joint provided by this invention:

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 180 parts by weight of naphthylene-1,5-diisocyanate are added at 135° C. to the dehydrated polyester while stirring. As soon as the temperature starts to drop, 20 parts by weight of butylene glycol-1,4 are stirred into the mixture at about 135° C. The resulting mixture is poured into a suitable mold. This has been so designed that the metal ring 3 and spirally-wound member 6 are inserted in the mold and the polyurethane is cast thereabout and solidified by curing. The above mixture is maintained in the mold at a temperature of about 110° C. for about 24 hours to form a homogeneous polyurethane rubber. After 24 hours the disc is removed from the heating chamber and the material then shows the following properties: The Shore A hardness 75°, resiliency 50°, elongation 600%.

It is to be understood that any suitable organic polyisocyanate, organic compound having reactive hydrogen atoms and cross-linking agent may be substituted for those in the foregoing example. Examples of these materials suitable for this purpose are found in the aforesaid patents. Moreover, it is to be understood that variations are permissible in the temperatures and processing steps insolong as the product obtained has the required physical characteristics. The invention thus contemplates in its broadest terms a polyurethane joint secured between two lengths of pipe and having a metal reinforcing member in external flanges and a spirally-wound metal reinforced for the walls about the bore of the joint.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

As indicated hereinbefore, the molecular weight of the organic compound having reactive hydrogen atoms which is reacted with the organic polyisocyanate in the preparation of the polyurethane should be at least about 750. Although the chemistry involved in the preparation of the polyurethane is not specifically involved in this invention because any polyurethane having the required physical characteristics may be used to form the expansion joint, it is considered advisable to point out that the polyester may be prepared by esterification of any suitable polycarboxylic acid, such as, for example, adipic acid, succinic acid, and the like. A desirable polyalkylene ether glycol may be prepared by the condensation of a lower alkenyl oxide, such as, for example, ethylene oxide, propylene oxide, butylene oxide, and the like.

What is claimed is:

1. A substantially non-porous rubber-like polyurethane pipe line expansion joint having a bore extending longitudinally therethrough, an external flange at each end thereof and an external wall extending between said flanges, a metal ring imbedded in each end of said joint having one edge lying within said flange and the other edge near the wall of said bore, means for attaching said joint to a pipe in said flange and ring, that surface of each flange facing the other flange being tapered with the thickness of the flange at the point where it meets the said external wall being less than the thickness at its maximum diameter, and a spirally-wound metal member disposed tightly about said external wall and secured in place by said tapered surfaces of the flanges said spirally-wound member having a length when adjacent loops thereof engage each other greater than the distance between the outer radial tapered surfaces of said flanges.

2. A substantially non-porous rubber-like polyurethane pipe line expansion joint having a bore extending longitudinally therethrough, an external flange at each end thereof and an externol wall extending between said flanges, a metal ring imbedded in each end of said joint having one edge lying within said flange and the other edge near the wall of said bore, means for attaching said joint to a pipe in said flange and ring, that surface of each flange facing the other flange being tapered with the thickness of the flange at the point where it meets the said external wall being less than the thickness at its maximum diameter, and a spirally-wound metal member disposed tightly about said external wall and secured in place by said tapered surfaces of the flanges said spirally-wound member having a length when adjacent loops thereof engage each other greater than the distance between the outer radial tapered surfaces of said flanges, said polyurethane having a Shore A hardness of from about 50° to about 90° and an elasticity of from about 35% to about 60%.

3. A resilient pipe line expansion joint having a bore extending longitudinally therethrough, an external flange at each end thereof, and an external wall extending between said flanges, a metal ring embedded in each end of said joint having one edge lying within said flange and the other edge near the wall of said bore, means provided in said flange and said metal ring for attaching said joint to a pipe, the surface of each flange facing the opposite flange of said expansion joint being tapered with the thickness of the flange at the point where it meets said external wall being less than the thickness at its maximum diameter and a spirally-wound metal member, fitted tightly about said external wall and secured in place by said tapered surfaces of said flanges said spirally-wound member having a length when adjacent loops thereof engage each other greater than the distance between the outer radial tapered surfaces of said flanges.

References Cited in the file of this patent

UNITED STATES PATENTS

| | | |
|---|---|---|
| 996,899 | Witzenmann | July 4, 1911 |
| 1,696,435 | Fraley | Dec. 25, 1928 |
| 2,047,904 | Hollaty | July 14, 1936 |
| 2,126,706 | Schmidt | Aug. 16, 1938 |
| 2,267,085 | Dezendorf | Dec. 23, 1941 |
| 2,536,216 | Powell | Jan. 2, 1951 |
| 2,692,782 | Jones | Oct. 26, 1954 |
| 2,711,331 | Temple | June 21, 1955 |
| 2,807,480 | Hughes | Sept. 24, 1957 |

FOREIGN PATENTS

| | | |
|---|---|---|
| 3,844 | Great Britain | Mar. 10, 1915 |
| 176,050 | Great Britain | Feb. 27, 1922 |
| 688,995 | France | May 20, 1930 |
| 602,547 | Germany | May 29, 1935 |
| 536,846 | Great Britain | May 29, 1941 |
| 547,375 | Great Britain | Aug. 25, 1942 |
| 594,220 | Great Britain | Nov. 5, 1947 |
| 806,817 | Germany | June 18, 1951 |
| 865,244 | Germany | Dec. 18, 1952 |
| 1,112,370 | France | Nov. 16, 1955 |